United States Patent [19]

Bohnen

[11] Patent Number: 5,024,409
[45] Date of Patent: Jun. 18, 1991

[54] SLIDABLY LOCKABLE BRACKET

[76] Inventor: David J. Bohnen, 1910 Ala Moana Blvd., #18-D, Honolulu, Hi. 96815

[21] Appl. No.: 504,547

[22] Filed: Apr. 4, 1990

[51] Int. Cl.[5] ............................................. F16B 12/00
[52] U.S. Cl. .................................. 248/222.4; 248/343
[58] Field of Search ............... 248/222.4, 223.1, 224.1, 248/224.2, 342–344

[56] References Cited

U.S. PATENT DOCUMENTS

| | | |
|---|---|---|
| 435,625 | 9/1890 | Goodyear et al. |
| 926,193 | 6/1909 | Johnson. |
| 1,007,489 | 10/1911 | Reichel .................. 248/222.4 X |
| 2,448,001 | 8/1948 | Maurette .................. 248/343 |
| 2,507,308 | 5/1950 | Kruger .................. 248/343 |
| 2,509,395 | 5/1950 | Wakefield .................. 248/343 |
| 2,562,406 | 7/1951 | Barker .................. 248/343 X |
| 2,621,357 | 12/1952 | Stuman. |
| 2,906,488 | 9/1959 | Wolar .................. 248/343 X |
| 3,270,996 | 9/1966 | Churchill. |
| 3,676,570 | 7/1972 | Gabb .................. 248/343 X |
| 3,814,084 | 6/1974 | Gustafson. |
| 4,072,308 | 2/1978 | Applegate. |
| 4,109,907 | 8/1978 | Zito. |
| 4,190,221 | 2/1980 | Updike .................. 248/222.4 X |
| 4,193,571 | 3/1980 | Bula .................. 248/343 |
| 4,229,002 | 10/1980 | Masters. |
| 4,470,716 | 9/1984 | Welch. |

Primary Examiner—Gary L. Smith
Assistant Examiner—Suzanne L. Dino
Attorney, Agent, or Firm—Martin E. Hsia

[57] ABSTRACT

A slidably lockable bracket having two levels and a keyhole aperture with a slot running from the upper level to the lower level and an enlarged aperture at the end of the slot at the upper level. A sliding member having a post and an enlarged head is engaged and locked in the bracket by inserting the head through the enlarged aperture, sliding the post along the slot, and dropping the head in the lower portion, thereby locking the head on the lower level. Preferably the lower level is configured to retain the head.

5 Claims, 2 Drawing Sheets

SLIDABLY LOCKABLE BRACKET

BACKGROUND OF THE INVENTION

This invention relates to a slidably lockable bracket and specifically to a bracket adapted for slidably and lockably suspending a pulley from the top of a door frame.

Obtaining adequate physical exercise while away from a gym or health club presents difficulties to those interested in maintaining their physical condition and fitness. Accordingly, many people interested in physical fitness wish to exercise at home. However, home exercising equipment is often costly, conspicuous, bulky and difficult to set up and store.

Many attempts have been made to create inexpensive and compact exercising equipment that can be easily and safely used at home but that can be set up and stored quickly and easily. Many of these home exercise devices have used a pulley with its axis of rotation in a horizontal position that is suspended from an elevated location so that a user can suspend weights from one end of a rope which goes through the pulley and then use the other end of the rope for exercise.

For example, U.S. Pat. No. 4,109,907 to Zito discloses clips for engagement over the upper edge of a door and suspending a pulley from flanges at the end of each of the clips.

U.S. Pat. No. 3,814,084 to Gustafson discloses a U shaped bracket adapted to fit over the top edge of a door carrying an outwardly and upwardly projecting pole to which a pulley is attached.

U.S. Pat. No. 4,072,308 to Applegate discloses a U shaped frame which can be removably secured to the upper edge of a door and a selectively fillable bag attached to a cable that guides over the upper end of the frame.

U.S. Pat. No. 4,229,002 to Masters discloses a golf swing exercise device having a horizontal base to which is secured door hooks.

However, the foregoing require the use of brackets or other mounting means that are conspicuous and inconvenient to mount and dismount because the brackets must be placed over the top of a door. Thus, there is a need for a bracket that can suspend a pulley or other attachment from the top of a door frame with its axis of rotation in a horizontal position, yet that can allow quick and easy mounting and dismounting of the pulley.

The pulley or other attachment also must be positively lockable because it will be used to suspend weights and the inability to lock the pulley in place could present a safety hazard. Further, because the top of a door frame is a relatively inconvenient location, the pulley should be easily lockable without exerting substantial effort. Accordingly, such a bracket should allow mounting, locking, releasing and removing of the pulley with minimum vertical movement. This requires that these functions be capable of accomplishment by sliding the pulley horizontally.

Several references disclose slidable brackets that can be adapted to suspend a pulley.

U.S. Pat. No. 926,193 to Johnson discloses a pulley attached to a base having channels. A shell or casing defines a slot having guide flanges that engage with the channels to slidably retain the pulley.

U.S. Pat. No. 4,470,716 to Welch discloses a furniture fastener comprising a clip with a raised central portion having an inclined slot with an internal locking flange extending at an upwards angle toward the raised central portion and terminating below the slot.

U.S. Pat. No. 2,621,357 to Stuman discloses a handle mounting means comprising keyhole slots having an elongated narrow portion in communication with an enlarged circular portion so that the head of a screw may be inserted through the enlarged portion of the keyhole and the shank of the screw may be received in the narrow portion of the keyhole slot. The screws are then slid from the enlarged portion, over a leaf spring and then locked into position after passing over the central portion of the leaf spring.

U.S. Pat. No. 3,270,996 to Churchill discloses a coat hook and attachment having a base with a cupped portion to provide an engagement depression to engage the head of a stud.

U.S. Pat. No. 435,625 to Goodyear discloses a hanger for a clothes line mounted on a bolt.

None of the references teaches the use of a bracket that allows a pulley or other attachment to be easily mounted, locked, released and removed primarily by sliding in a horizontal direction.

Johnson does not appear to provide a locking means, and the locking mechanisms of Welch and Stuman would not allow the pulley or other attachment to be easily and quickly released and dismounted. Churchill provides a slidable coat hook, but requires that an opening be provided in a side perpendicular to the slot so that the stud may enter into the slot. This would weaken the apparatus if it were subjected to forces perpendicular to the direction of the slot and also would require that the stud entry side have an aperture large enough for the head of the stud to pass through.

It is therefore an object of this invention to provide a bracket adapted for suspending a pulley or other attachment from the top of a door frame and slidably locking the pulley in place.

It is another object of this invention to provide a bracket that allows a pulley or other attachment to be easily, quickly and positively locked in position, yet that also allows the pulley to be easily and quickly released and removed.

It is another object of this invention to provide such a bracket that will be relatively inconspicuous and therefore can be left permanently installed.

It is a still further object of this invention to provide such a bracket that is of simple construction and inexpensive manufacture.

It is yet another object of this invention to provide such a bracket that is strong enough to be able to function in a weight lifting exercise apparatus.

SUMMARY OF THE INVENTION

These and other objects are accomplished by a bracket comprising a base having an upper level and a lower level with a slot extending from the upper level to the lower level and an enlarged opening at the end of the slot on the upper level. A pulley or other attachment then could be provided with a sliding member that includes a post and an enlarged head. To mount and lock the pulley, the head of the member could be passed through the enlarged opening and the post could be slid along the slot to the end opposite the enlarged opening, which would be on the lower level. The head then could be dropped onto the lower level and would be retained there against forces urging the post and the head in the direction of the enlarged opening. Preferably, the lower level is adapted to receive the head.

To release and dismount the pulley, the pulley is raised until the bottom surface of the head is above the upper surface of the bracket, the post then is slid along the slot until the head reaches the enlarged opening, and the head is withdrawn from the bracket through the large opening.

DETAILED DESCRIPTION OF THE PREFERRED EMBODIMENT.

Figure 1:
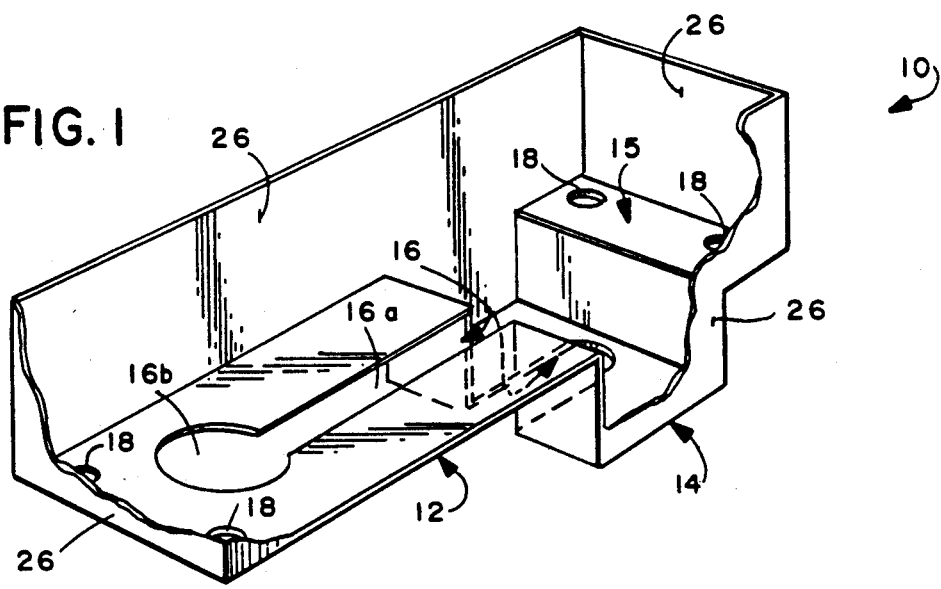
FIG. 1 is a perspective view of the base of a preferred embodiment of this invention, with the sides omitted for clarity.

Referring to FIG. 1, a base 10 of a preferred embodiment of a bracket in accordance with this invention is shown. The base 10 has an upper level 12 and a lower level 14. The base also may be (but need not be) provided with an end portion 15 beyond the lower level 14 that is coplanar with the upper level 12 for ease of mounting the base 10. A keyhole slot 16 comprising a slot 16a and an enlarged portion 16b at the end of the slot on the upper level 12 is provided in the base 10. Preferably, the base 10 is provided with four screw holes 18 at the corners for attachment to a surface.

Figure 2:
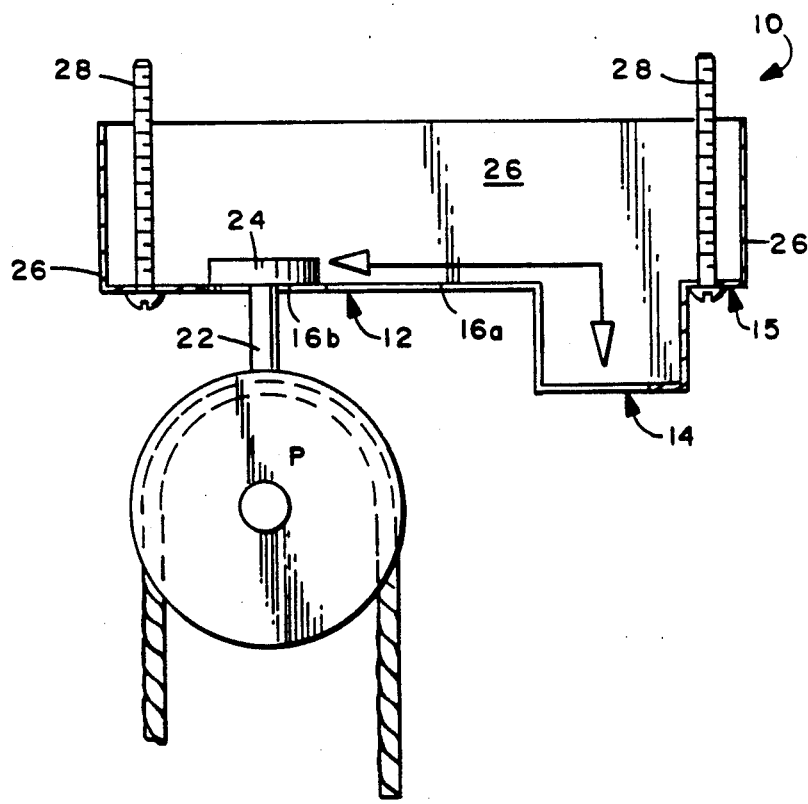
FIG. 2 is a side sectional view of the preferred embodiment of FIG. 1 showing a pulley engaged therein.

FIG. 2 shows a side elevational view of the preferred embodiment of a bracket in accordance with this invention with a pulley P mounted thereon. The pulley P is attached to a sliding member comprising a post 22 having an enlarged head 24 attached to the end opposite the pulley P. To mount the pulley P, the enlarged head 24 is passed through the enlarged portion 16b of the keyhole aperture 16 until the head 24 has passed entirely through the base 10 of the bracket. The post 22 then is slid along the slot 16a until the head 24 is above the lower level 14. Preferably, the lower level 14 is adapted to receive the head 24 therein and therefore defines a recess for the head 24. The head 24 then can be dropped into the lower level 14 where it is retained in place by gravity or other forces acting perpendicular to the plane of the slot 16a. The bracket is preferably provided with sides 26 and is preferably attached to a surface by screws 28 passing through screw holes 18 (shown in FIG. 1).

Because the entire head 24 must pass through the enlarged portion 16b of the keyhole aperture 16, the height of the walls 26 at the upper level 12 of the base 10 must be greater than the height of the head 24. Because the lower level of the base 10 is lower than the upper level 14 of the base 12, the height of the walls 26 at the lower level 14 must be greater than the height of the walls 26 at the upper level 12.

Figure 3:
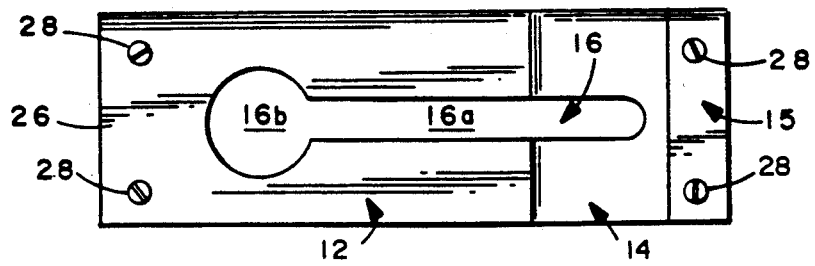
FIG. 3 is a bottom plan view of the preferred embodiment of FIG. 1.

FIG. 3 shows a bottom plan view of the bracket of FIG. 2. For strength, it is preferred that the base 10 be provided with sides 26 attached to all edges.

Figure 4:
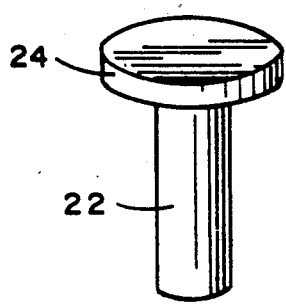
FIG. 4 is a perspective view of a sliding member adapted for use with this invention.
Figure 5:
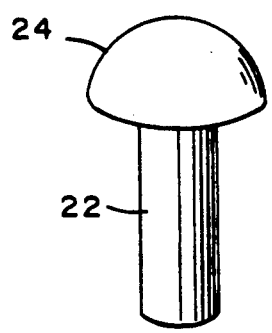
FIG. 5 shows an alternative form of a sliding member adapted for use with this invention.

Referring to FIG. 4, the sliding member preferably includes a cylindrical post 22 and a cylindrical head 24. However, as indicated in FIG. 5, the head 24 can be substantially hemispherical in shape instead. The head 24 can also be other shapes, such as square or rectangular.

Figure 6:
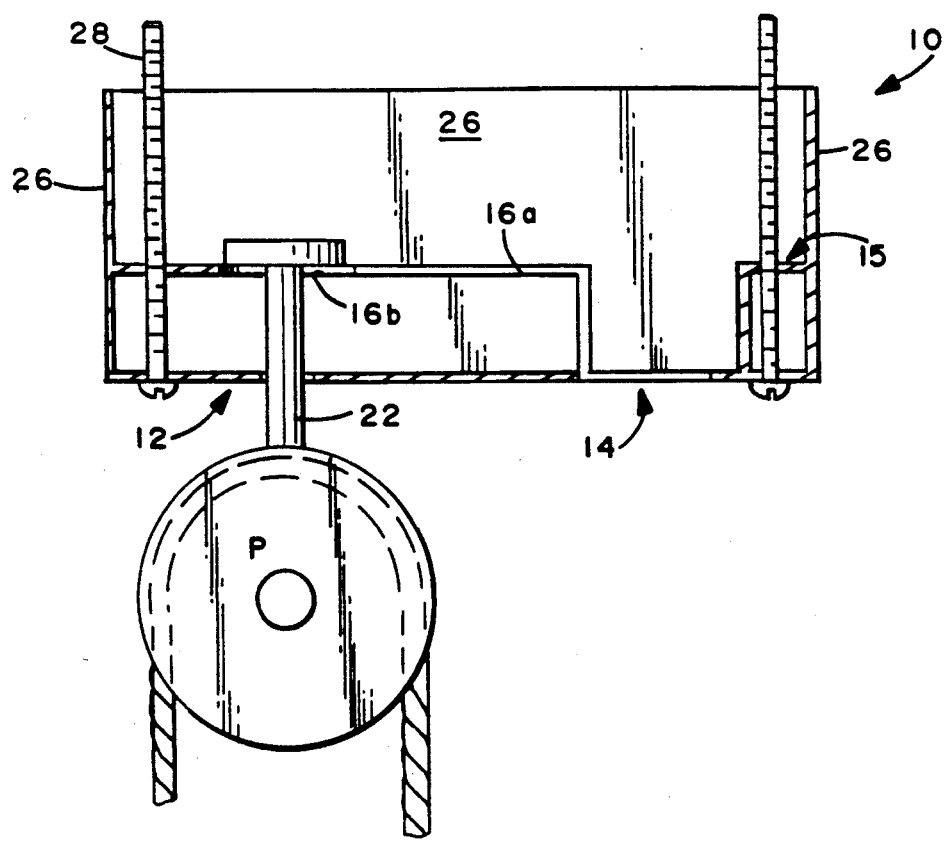
FIG. 6 shows a sectional view of an alternative form of a bracket in accordance with this invention.

FIG. 6 discloses a bracket with an alternative attachment so that the bottom of the bracket is defined by a single plane, instead of having a downward projection. In this embodiment, the sides 26 extend downward until they are flush or below the lower level 14 of the base 10, instead of having the base 10 define the bottom of the bracket. This presents a more aesthetically pleasing appearance.

The invention has been disclosed only with respect to a particular preferred embodiment. However, those skilled in the art will appreciate that many alterations and modifications in the details of the invention can be made without departing from the scope and spirit of the same. For example, and not by way of limitation, the enlarged portion of the keyhole aperture need not be circular but can be any other shape and the base of the bracket can be provided with sides on less than all the edges. For a further example, the cross sections of the post and the enlarged head need not be circular. Accordingly, no limitations are to be implied or inferred except as specifically set forth in the appended claims.

What is claimed is:

1. A slidably lockable bracket for a sliding member having a substantially cylindrical post having a post diameter and a head having a head height and a head diameter, attached to one end of said post, said head diameter being greater than said post diameter, comprising:
    a base having a keyhole aperture, which keyhole aperture has:
        a circular portion having a diameter greater than said head diameter; and
        an elongated slot having a width intermediate between said post diameter and said head diameter extending away from said circular portion;
    attachment means for attaching said base substantially parallel to a surface wherein said circular portion is spaced apart from said surface by a first distance greater than said head height; and
    said base having a recess at a recessed end of said slot opposite said circular portion, said recessed end of said slot being recessed away from said surface by a second distance greater than said first distance and said recess being adapted to receive said head, wherein:
    said base has a plurality of edges and said attachment means comprises a plurality of side members, each attached to one of said edges.

2. A bracket according to claim 1, wherein said recessed portion and said surface are parallel and define a maximum distance between said base and said surface, and wherein said side members have a height substantially equal to said maximum distance.

3. A slidably lockable bracket for a sliding member having a substantially cylindrical post having a post diameter and a head having a head height and a head diameter, attached to one end of said post, said head diameter being greater than said post diameter, comprising:
    a base having a keyhole aperture, which keyhole aperture has:

a circular portion having a diameter greater than said head diameter; and an elongated slot having a width intermediate between said post diameter and said head diameter extending away from said circular portion;

attachment means for attaching said base substantially parallel to a surface wherein said circular portion is spaced apart from said surface by a first distance greater than said head height; and said base having a recess at a recessed end of said slot opposite said circular portion, said recessed end of said slot being recessed away from said surface by a second distance greater than said first distance and said recess being adapted to receive said head, wherein:

said base has a first end adjacent to said circular portion of said keyhole aperture, a second end adjacent to said recess, and two elongated edges extending from said first end to said second end; and said attachment means comprises:

first and second sides, each having a head portion of a first height and a recess portion of a second height, said first height being greater than said head height, said second height being greater than said first height, and said head portion of said first and second sides being attached to both of said edges near said first end and said recess portion of both of said sides being attached to both of said edges near said second end.

4. A bracket according to any one of claims, 1, 2 or 3, wherein:

said sides are integrally formed with said base.

5. A bracket according to any one of claims 1, 2 or 3, wherein:

said walls and sides are formed of metal.

* * * * *